Nov. 19, 1963         R. D. ROLAND         3,111,155
TIRE CHAINS
Filed Feb. 19, 1962
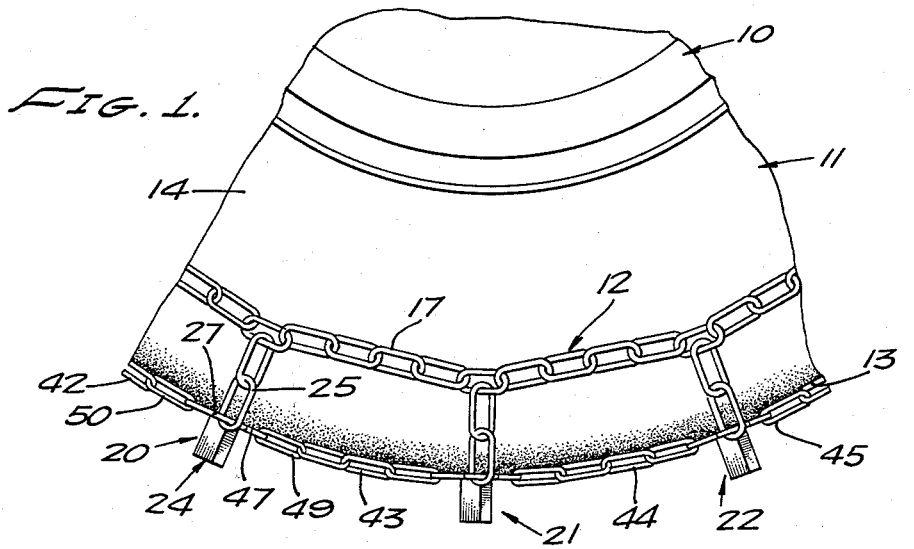
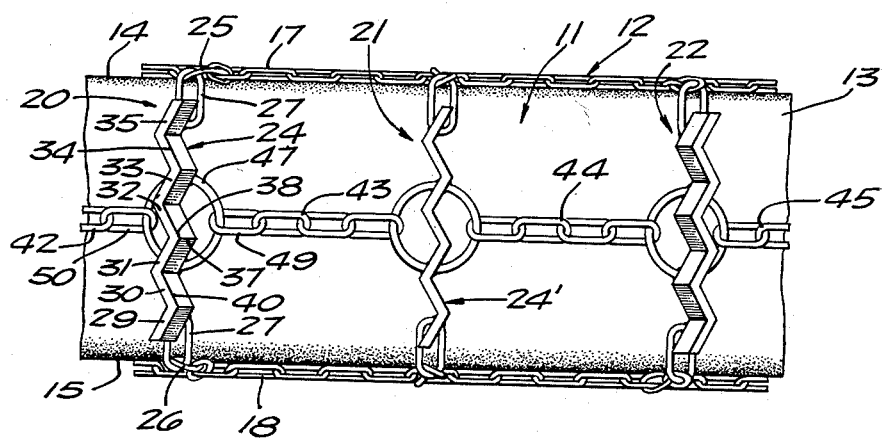
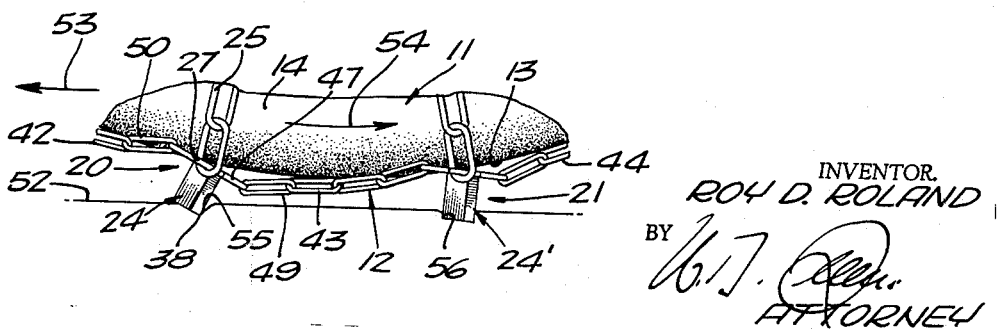
INVENTOR.
ROY D. ROLAND
BY
ATTORNEY

United States Patent Office 3,111,155
Patented Nov. 19, 1963

3,111,155
TIRE CHAINS
Roy D. Roland, 2902 N. Alta Vista, Flagstaff, Ariz.
Filed Feb. 19, 1962, Ser. No. 174,103
7 Claims. (Cl. 152—239)

This invention relates to anti-skid attachments or tire chains for automobiles.

The tire chains of this invention are characterized as having zigzag cleats extending transversely of the tread of a tire on which the chain is mounted. The zigzag configuration of the cleats presents sharp edges and corners which dig into a surface of ice, for example, over which the automobile may be traveling, and thus, provides traction against skidding.

In a preferred embodiment of the invention the zigzag cleats are adapted to swing or pivot to a position of an acute angle from a straight line directly across the tire tread. Thus, should the automobile tend to swerve or skid sideways the cleat on the bottom of the tire will swing to an oblique position where its sharp edges restrain against sidewise skidding.

General objects of the invention are to provide tire chains with cleats of the above-mentioned character, the tire chains being simple and rugged in construction, reliable in performance and economical to manufacture.

Further objects and advantages will appear in the following part of this specification wherein the details of construction and mode of operation of a preferred embodiment are described with reference to the accompanying drawing, in which:

FIGURE 1 is a side elevation of a sector of a wheel with pneumatic tire and a tire chain of this invention;

FIGURE 2 is a bottom view with respect to FIGURE 1; and,

FIGURE 3 is a view illustrating how the cleats on the tire chain dig into a surface of ice, for example, over which the wheel is traveling.

Referring to the drawing in greater detail, reference numeral 10 designates a wheel of an automobile, having a pneumatic tire 11 with a tire chain of this invention, designated generally by reference numeral 12, mounted around the tire. The outside circumference or tread surface of the tire is designated by numeral 13, and its side walls by numerals 14 and 15 respectively.

The improved tire chain comprises suitably constructed side chains 17 and 18 which extend concentrically of and are disposed against the side walls 14 and 15 respectively of the tire. There is a circumferentially arranged series of uniformly spaced apart cross members each of which extends transversely of the tire tread to and between the side chains, the illustrated wheel sector having three such cross members designated generally by reference numerals 20, 21 and 22 respectively. The cross members are identical in construction to each other, whereby a description of the details of one will suffice for the others.

Referring to cross member 20 as a specimen, it comprises a rigid zigzag cleat 24 extending longitudinally of the cross member and two chains 25 and 26, here of three links each, for connecting the ends of the cleat to the side chains 17 and 18 respectively. In the illustrated embodiment the manner of connecting the end chains 25 and 26 to the cleat is, in the instance of end chain 25 for example, by welding an end link 27 of chain 25 flat upon the bottom surface of an end portion of the cleat.

The cleat may be appropriately described in detail as being formed of a series of straight cleat sections 29 to 35 inclusive, extending at obtuse angles from each other (here about 120 degrees each) in a zigzag pattern across the tread surface of the tire, with such cleat sections in the illustrated embodiment being of substantially equal length and being of rectangular cross section. Thus the cleat has angle edges along which adjacent cleat sections meet, as, for instance, angle edge 37 for cleat sections 31 and 32, and the cleat has trihedral points or corners, as, for instance, corner 38 defined by the outer surface 40 of the cleat and those side surfaces of cleat sections 31 and 32 which face towards the right in FIGURE 2. The rectangular configuration of the cleat sections in cross section is such that the longer axis thereof extends radially outward from the tread surface of the tire, and the shorter axis thereof, which defines the thickness of the cleat sections, extends in a direction generally circumferentially of the tire. The angles of the cleats, as defined by adjacent pairs of cleat sections, alternate in their direction of pointing circumferentially of the tire. In the illustrated embodiment where the cleat sections 29 to 35 inclusive are of substantially the same length and the angles between adjacent pairs of sections are uniform, it may be said, for the purposes of describing the cleat configuration in great particularity, that the angle bisectors extend in a direction circumferentially of the tire when the cleats are in the FIGURE 2 position of extending directly across the tread of the tire.

The cleats are interconnected by a series of flexible members or, more particularly, lengths of chain extending circumferentially of the tire and medially between the side chains 17 and 18, such chain lengths as appear in the drawing being designated by numerals 42 to 45 respectively. Each cleat has a flat member, here in the form of a ring, which in the case of cleat 20 is designated by reference numeral 47, such rings being welded or otherwise suitably secured flat upon the undersurfaces of the cleats respectively, and diagonally across the cleats. The rings are large enough in size to extend in a direction circumferentially of the tire beyond the corner edges, e.g., 37 of the cleats. An end link 49 of chain length 43 is looped through the ring 47 at one side of the cleat 24 and an end link 50 of chain length 42 is looped through the ring 47 at the other side of the cleat whereby the cleats 24 are pivotally connected to the chain lengths 42—45.

Pivotal connection of the zigzag cleat to the medial chain lengths 42—45 permits swinging of the cleats to respective positions of an acute angle from a line directly across the tire tread. Thus when the wheel tends to swerve or skid sidewise, the bottom cleat of the tire chain will pivot or swing to an oblique position in which its corners will be directed slightly laterally of the tire and thus provides traction against sidewise skidding.

Referring to FIGURE 3 of the drawing, it will be noted that the height or longer axis of the rectangular cross section of the cleats is such that the cleats of each pair of adjacent cross members, e.g. 20 and 21, extend radially outward from the tire beyond a tangent to the tread surface at a point intermediate the cross members. Thus, as the wheel rolls over a flat road surface represented at 52, it bears on the cleats 24 with the tread surface 13 of the tire being spaced above the road surface. FIGURE 3 illustrates the manner in which the cleats bite into the surface 52. Assuming that the weeel is rolling generally in the direction of arrow 53, whereby the wheel will be rotating in the direction of arrow 54, the cleat 24 of cross member 20 upon its engagement with the road surface 52 will include in a direction opposite to the direction of rotation of the tire, and its sharp corners 38 on the leading side of the cleat will dig into the surface 52 each forming a dint 55 with the result of increasing traction against skidding. As the tire continues to roll in the direction of arrow 53 the corners on the trailing side of the cleat will also dig into the surface 52 as is illustrated in FIGURE 3 by dint 56 formed by cleat 24 of cross member 21.

While the particular tire chains herein shown and disclosed in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

I claim:

1. A tire chain comprising two side members adapted to extend concentrically of the side walls respectively of a pneumatic tire, and a plurality of cross members extending transversely of the tread of the tire between said side members, each cross member comprising a rigid zigzag cleat the tire chain further comprising means extending circumferentially of the tire tread midway between the side members and pivotally interconnecting the centers of the cleats, whereby each cleat is adapted to pivot to a limited degree about a radial axis passing through the medial circumferential line of the tire tread to provide traction against sidewise skidding of the tire.

2. In combination with a tire having two side walls and a circumferential tread surface, a tire chain mounted on the tire and comprising two flexible side members concentric with and disposed against said side walls respectively, a plurality of spaced apart cross members extending to and between the side members and transversely of the tire tread, each cross member comprising a rigid cleat of rectangular cross section formed of a series of cleat sections extending at angles to each other in a zigzag pattern across the tread surface with the apexes of the angles pointing circumferentially of the tire, and flexible members connecting the ends of the cleats to the side members respectively, each cleat having a flat member secured at the center of the cleat and disposed between the cleat and the tread surface and on the medial circumferential line of the tread surface, and a series of flexible members extending circumferentially of the tire and medially of the tire tread and each being connected at its ends to the flat members respectively of adjacent pairs of cross members whereby the cleats are pivotally mounted for becoming askew with respect to said tread surface to provide traction against sidewise skidding of the tire.

3. In combination with a tire having two side walls and a circumferential tread surface, a tire chain mounted on the tire and comprising two side chains concentric with and disposed against said side walls respectively, a plurality of uniformly spaced apart cross members extending to and between the side chains and transversely of the tire tread, each cross member comprising a rigid cleat of rectangular cross section having a longer axis and a shorter axis and with the longer axis extending in a radial direction with respect to the tire, the cleat being formed of a series of cleat sections extending at obtuse angles to each other in a sigzag pattern across the tread surface with the perpendicular bisectors of said obtuse angles extending in a direction generally circumferentially of the tire, and two link chains each connected at one end thereof to the ends respectively of the cleat and at its other end to the side chains respectively, each cleat having a ring secured at the center of the cleat and disposed between the cleat and the tread surface and on the medial circumferential line of the tread surface, and a series of lengths of chain extending circumferentially of the tire and medially of the tread surface, each of said chain lengths having its ends looped through the rings respectively of adjacent pairs of cross members whereby the cleats are pivotal at their centers on a medial circumferential line of the tire tread to a position of an acute angle from a line across the tire tread, thus to provide traction against sidewise skidding of the tire.

4. An antiskid device for use on tires of motor-propelled vehicles comprising a plurality of similar cleats, said cleats each comprising thin wide strips of metal adapted to be mounted crosswise of the vehicle tire and spaced apart circumferentially of the tire with the width of the strip lying generally normal to the surface of the tire tread, and chain means connecting the opposite ends of said cleats together along the opposite lateral sides of the tire tread, said cleats extending at right angles to the longitudinal center line of the tire tread in a manner permitting individual ones of said cleats to tilt about the edge thereof adjacent the tire tread as well as to pivot through a limited arc about an axis passing transversely of the width of the cleat near the longitudinal center thereof, the tilting of the cleats being effective to increase ground gripping effectiveness during deceleration and acceleration, and the pivoting of the cleats being effective to increase ground gripping effectiveness during sidewise skidding of the vehicle.

5. An antiskid device as defined in claim 4 characterized in the provision of high-strength flexible tie means surrounding the tire tread medially of the ground contacting surface and including means movably connecting the same to the mid-length of said cleats adjacent the edge thereof nearest the tire tread, said flexible tie means providing an anchor about which said cleats can pivot to resist sidewise skidding of the vehicle.

6. An antiskid device as defined in claim 4 characterized in that said cleats are of zigzag contour lengthwise thereof to provide increased ground gripping contact surfaces to resist lengthwise and sidewise skidding of the vehicle on slippery surfaces.

7. An article of manufacture comprising an antiskid cleat adapted to be used with other similar cleats and mounted transversely of and about the tread of a vehicle tire, said antiskid cleat comprising an elongated relatively thin but wide strip of abrasion resistant metal deformed transversely of its width to present a zigzag configuration when viewed from the edge of the cleat, rigid loop means secured to the midportion of one lateral edge of the cleat and projecting in opposite directions from the sides of the cleat, and loop means projecting from the opposite ends of said cleat and secured to the same edge thereof as the first mentioned loops and effective in securing said cleats crosswise of a tire tread while leaving the cleat free to tilt forwardly and rearwardly about the edge of the cleat closest to the tire tread in response to acceleration and deceleration of the tire.

References Cited in the file of this patent

UNITED STATES PATENTS

| | | |
|---|---|---|
| 1,168,597 | Brunton | Jan. 18, 1916 |
| 1,614,873 | Campbell | Jan. 18, 1927 |
| 1,803,027 | Mahan | Apr. 28, 1931 |
| 2,100,539 | Fritts | Nov. 30, 1937 |
| 2,441,670 | Morrone | May 18, 1948 |
| 2,779,379 | Willis | Jan. 29, 1957 |

FOREIGN PATENTS

| | | |
|---|---|---|
| 403,398 | Italy | Apr. 16, 1943 |